United States Patent
Le Pellec et al.

(10) Patent No.: US 9,683,671 B2
(45) Date of Patent: Jun. 20, 2017

(54) VALVE BLOCK ASSEMBLY FOR SEVERAL VALVES

(71) Applicant: Halla Visteon Climate Control Corp., Daejeon (KR)

(72) Inventors: Corinne Le Pellec, Pulheim (DE); Marc Graaf, Krefeld (DE)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 14/683,167

(22) Filed: Apr. 10, 2015

(65) Prior Publication Data

US 2015/0292647 A1    Oct. 15, 2015

(30) Foreign Application Priority Data

Apr. 10, 2014  (DE) .................. 10 2014 105 097

(51) Int. Cl.
*F16K 27/00*       (2006.01)
*F15B 13/08*      (2006.01)

(52) U.S. Cl.
CPC ........ *F16K 27/003* (2013.01); *F15B 13/0814* (2013.01); *Y10T 137/87153* (2015.04); *Y10T 137/87249* (2015.04); *Y10T 137/87885* (2015.04)

(58) Field of Classification Search
CPC .......... F16K 27/003; Y10T 137/87249; Y10T 137/87885; Y10T 137/87153; F15B 13/0814
See application file for complete search history.

(56) References Cited

U.S. PATENT DOCUMENTS

| | | | | |
|---|---|---|---|---|
| 5,209,258 A | * | 5/1993 | Sharp | .................. G01F 1/36 137/343 |
| 6,036,107 A | * | 3/2000 | Aspen | ............... A01M 7/0089 137/883 |
| 6,698,621 B2 | | 3/2004 | Landers et al. | |
| 2010/0263741 A1 | * | 10/2010 | Fuerst | ................ B60T 8/368 137/343 |

FOREIGN PATENT DOCUMENTS

| | | |
|---|---|---|
| DE | 19537482 A1 | 4/1997 |
| DE | 102006026359 A1 | 12/2007 |
| DE | 102006060923 A1 | 6/2008 |
| DE | 102010042127 A1 | 4/2012 |
| DE | 102012111467 A1 | 6/2013 |
| DE | 102012111468 A1 | 6/2013 |
| DE | 102012111672 A1 | 10/2013 |
| JP | 05-164260 A | 6/1993 |
| JP | 11-159649 A | 6/1999 |
| JP | 2000028470 A | 1/2000 |
| JP | 2011235753 A | 11/2011 |
| KR | 1020140024810 A | 3/2014 |

* cited by examiner

*Primary Examiner* — Atif Chaudry
(74) *Attorney, Agent, or Firm* — Schumaker Loop & Kendrick LLP; James D. Miller

(57) ABSTRACT

A valve block assembly for multiple valves, in particular expansion valves and/or shut-off valves, includes a valve block having a plurality of flow paths for fluids and a plurality of adjustment units with assigned drive units, wherein the valve block is designed as comprising two parts, these being a flow path element with the flow paths and a limiting element.

12 Claims, 3 Drawing Sheets

VALVE BLOCK ASSEMBLY FOR SEVERAL VALVES

CROSS-REFERENCE TO RELATED APPLICATIONS

This application claims priority to German Patent Application No. 10 2014 105097.5, filed on Apr. 10, 2014, the disclosure of which is incorporated herein by reference in its entirety.

FIELD OF THE INVENTION

The invention relates to a valve bock assembly for multiple valves, suitable particularly for use in combined refrigeration systems and heat pump systems of motor vehicles.

BACKGROUND OF THE INVENTION

Complex fluid system circuits are known in the prior art which involve various circuit options within the fluid system based on the functionalities that are required.

For example, DE 10 2006 026 359 B4 describes an air conditioning system for vehicles which comprises a combined refrigeration system and heat pump system. Additional applications for generic valve block assemblies include refrigeration systems according to DE 10 2010 042 127 A1 and DE 10 2012 111 672 A1.

In the aforementioned complex circuit systems according to the prior art, valves for switching between refrigeration system operation and heat pump operation are described. In particular, these systems also employ externally controllable expansion valves. As valves and particularly as expansion valves in circuit arrangements of this type, spherical valves having an external seal arrangement according to DE 10 2012 111 467 A1, or spherical valves having an internal seal arrangement according to DE 10 2012 111 468 A1 are used in motor vehicle refrigerant circuits. The aforementioned spherical valves are operated both as switchover valves and/or shut-off valves, and as expansion valves.

In the prior art, for example in heat pump systems for use in automobiles, the valves are arranged individually in the system of lines.

Due to the weight of the valves, however, they cannot be supported by the lines alone, and must instead be mounted in the vehicle by means of mounting fixtures. To reduce the cost of assembly on the vehicle assembly line, multiple valves are usually combined with other components on a mounting plate to form sub-modules, which are then assembled and connected to the refrigerant lines. The submodule is then supplied pre-assembled to the automobile manufacturer and is installed in the vehicle on the line at a reduced cost of assembly.

The disadvantage of the submodule design is that a multiplicity of individual valves may have to be connected to other components, for example heat exchangers, by means of individual refrigerant lines within a very small space. This necessitates a multitude of short lines which must be manufactured with great precision in terms of manufacturing specifications, such as bending radii and distances between bends or between bends and brazed-on parts. Due to the high complexity and the costs associated with this, the risk also exists that the complex line routes may allow oil traps to form in the submodule, and that increased pressure losses may impair the conductibility and efficiency of the heat pump system.

Moreover, in a heat pump system, due to the number of valves and connecting lines, the number of separating points and therefore the risk of external leakage is increased.

A further disadvantageous aspect is that, under certain circumstances, significant quantities of refrigerant may be stored in the inner volume of the connecting lines of the submodules. This increases the volume of refrigerant required to operate the system and therefore also the costs. This also gives rise to safety-relevant and environmentally relevant disadvantageous aspects.

DE 10 2006 060 923 A1 discloses a valve block having at least a first connection and a second connection, the two connections being connected to one another within the valve block for temporarily adjusting flow paths in a coolant system and/or for filling and/or emptying the coolant system, wherein the valve block is made of a refrigerant-resistant and pressure-resistant plastic.

One disadvantage of such embodiments is that, although valve blocks made of plastic can be relatively cost-effectively produced, their mechanical durability is frequently insufficient for mobile applications and for use at high pressures, such as those occurring in high-pressure refrigeration circuits.

SUMMARY OF THE INVENTION

The object of the invention is therefore to devise a valve block assembly for multiple valves for fluid systems, in particular for refrigerant-conducting systems, which assembly decreases the number of separation points in the system of refrigerant lines and also has minimal impact on pressure losses on the refrigerant side.

A further object of the invention is to reduce the amount of refrigerant required by the system with regard to the component produced, and to likewise reduce the potential for oil retention and external refrigerant leakage.

The object is attained by a subject matter having the features according to claim 1. Developments are specified in the dependent claims.

The object of the invention is attained in particular by a valve block assembly for multiple valves, which comprises a valve block having a plurality of flow paths for fluids and a plurality of adjustment units with assigned drive units. The valve block is designed as having two parts, these comprising a flow path element with the flow paths arranged in said flow path element, and a limiting element. The limiting element acts as a cover and as a boundary between the flow paths and the exterior, and between any additional cavities or openings optionally provided in the flow path element and the exterior.

The valve block assembly is advantageously further enhanced in that the flow path element and the limiting element are designed as plates, with the flow path element comprising the openings for the flow paths and for the fluid connections. The limiting element has feed-through openings for adjustment elements of the adjustment unit. Seals for externally sealing the valve block assembly are provided at the feed-through openings.

The flow path element and the limiting element are advantageously designed as positionable relative to one another by means of pins or guide grooves.

To ensure safe operation of the valve block assembly, a seal is provided between the flow path element and the limiting element in the form of an adhesive connection as an adhesive bond, as a soft seal in the form of a sealing strip or as a surface seal in the form of a metallic seal or a soft surface seal.

With particular preference, the sealing surfaces for sealing the flow path internally relative to the adjustment unit are formed only on the flow path element. In other words, sealing surfaces for internal seals are formed in only one part of the two-part valve block, and therefore measures for increasing the internal seal tightness are formed and/or must be implemented only on the flow path element.

According to an alternative embodiment of the invention which is advantageous with regard to the design of the valve block as comprising two plates, the flow path element is designed as a rectangular block and the limiting element is designed as a cover element or as a valve body, with the openings for flow paths in the flow path element being designed as opposite and interconnected stepped bores.

An opening is provided at the side and extending into the flow path of the stepped bores, which opening is designed to receive the cover element or a valve body.

A plurality of openings is preferably covered by a common cover element, the cover element having an overflow channel, which is designed as integrated into the cover element. The cover elements further preferably comprise a stepped bore designed as a refrigerant connection.

According to an advantageous embodiment of the invention, the stepped bores of interconnected adjustment units are arranged in two opposing sides of the rectangular block.

Coplanar stepped bores on three or four sides of the rectangle are preferably interconnected.

Perpendicular to each stepped bore is an additional opening, preferably designed as a bore in the flow path element, via which the drive unit is connected to the mechanical adjustment unit in the flow path, according to an advantageous development of the invention.

It has been found that providing additional cavities or openings, for example in the form of bores, for incorporating sensors or for forming refrigerant connections designed perpendicular to the overflow channels is advantageous.

The drive units and sensors on one side of the flow path element and the fluid connections on the vertical surface of the block, coplanar with the openings of the adjustment units, form a further advantageous embodiment of the generic valve block assembly.

In this case, the fluid connections are arranged on the side opposite the adjustment units.

It is particularly advantageous for each adjustment unit to have its own drive unit, or alternatively for the multiple adjustment units to be connected to one another mechanically via a kinematic mechanism, and for the kinematic mechanism to be designed as adjustable by means of a drive unit.

Spherical valves are preferably used as the adjustment units.

The valve block assembly can advantageously be provided with additional components and features, and it is particularly advantageous for pressure sensors, temperature sensors or combined pressure and temperature sensors to be integrated into the valve block assembly.

It has proven advantageous for the control strategy for each drive unit to be assigned a control unit, with the control unit being designed as a LIN bus controller.

For the purposes of the invention, an adjustment unit is understood as a valve with a valve body, the valve body being moved by means of an adjustment element. In the embodiment of the invention that comprises a spherical valve as the adjustment unit, the valve body is therefore designed as a sphere and the adjustment element is designed as a tappet-like connection on the sphere.

The drive unit drives the adjustment element, which moves the valve body into the corresponding switching position. The drive of the valve body is controlled by means of a control unit, which controls the drive unit and therefore the adjustment element for the valve body.

The flow paths in the valve block are designed, for example, as bores, in particular as stepped bores, as milled out areas or as shaped areas in the flow path element. Moreover, without deviating from the concept of the invention, the flow paths can also be designed as openings produced in the valve block by other methods.

The valve block assembly according to the invention is associated with several advantages over valves known in the prior art. A particular advantage is that the combination of a plurality of individual valves with the flow paths associated therewith to form a valve block assembly results in a substantial reduction in installation space as compared with the known submodules. The integration of the individual fluid lines with their connections to the valves in the valve block results in a compact flow path configuration. The flow paths themselves are implemented in the valve block by means of corresponding openings and without line transitions between the individual lines and the valve components, which minimizes leakage in terms of external fluid losses.

This aspect is particularly advantageous if the valve block assemblies will be used in refrigeration systems such as refrigeration circuits and in heat pumps, since in most cases these systems must comply with strict specifications in terms of external leakage tolerances.

A further advantageous consequence of combining flow paths within the valve block is a reduction in costs due to the decrease in the number of fluid lines.

A further advantage achieved by the flow paths within the valve block, which in some cases are shortened substantially as compared with submodules according to the prior art, is that the inner volume of the refrigerant lines and therefore the refrigerant fill level and the refrigerant storage capacity of the valve block are effectively diminished, along with the risk of the formation of oil traps.

Further advantages include improved processing, easier assembly due to the reduced number of lines, and the fact that, in contrast to the prior art, no lines that are short and rigid and therefore difficult to assemble must be handled.

The packing density of the valve block assembly is very high, and internal leaks can be reduced as compared with submodules.

Thus according to the concept of the invention, a plurality of valves and flow paths for interconnecting the valves can be produced within a very narrow space and without additional components for mounting the valves or lines. Moreover, due to the structural configuration of the valve block as a plate or a block, valve block assemblies comply with the most stringent requirements in terms of pressure tightness of valves or valve assemblies. The valve block assemblies can therefore be used in high pressure refrigeration systems, such as $CO_2$ refrigeration systems.

BRIEF DESCRIPTION OF THE DRAWINGS

Additional details, features and advantages of embodiments of the invention are presented in the following description of embodiment examples, with reference to the attached set of drawings. The drawings show.

DETAILED DESCRIPTION OF EXEMPLARY EMBODIMENTS OF THE INVENTION

Figure 1:
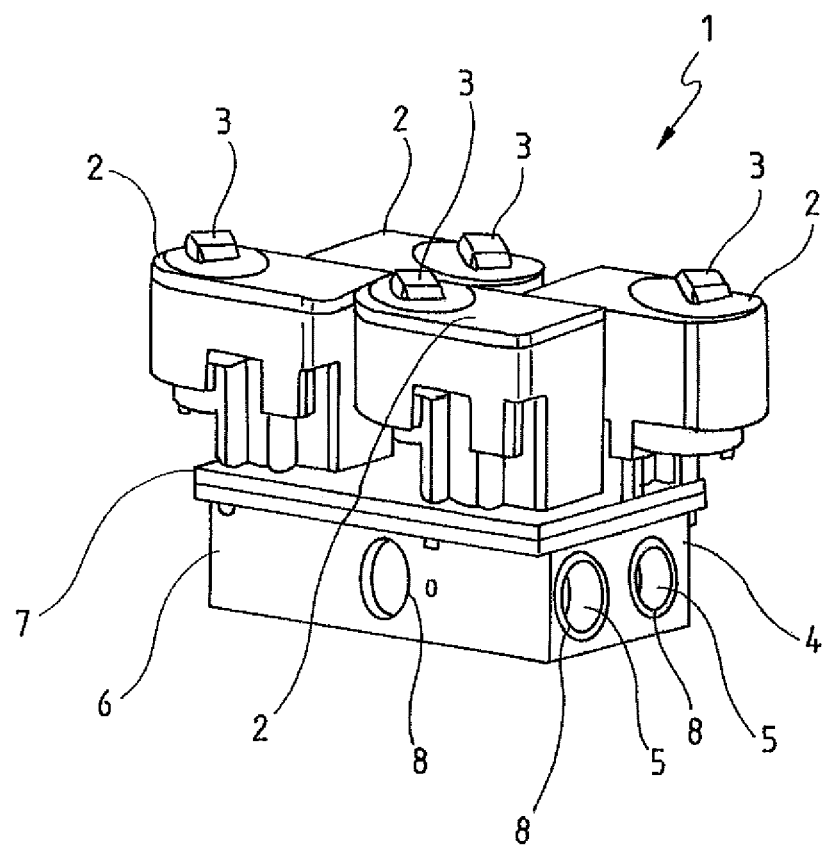
FIG. 1: a perspective representation of a valve block assembly.

FIG. 1 shows a perspective view of a valve block assembly 1 comprising the main components of an adjustment unit 2, a drive unit 3 and a valve block 4. The valve block 4 is constructed in two parts comprising a flow path element 6 and a limiting element 7. The flow path element 6 contains flow paths 5 for the fluids, and fluid connections 8 for corresponding fluid lines with the associated connecting ports provided at the outer margins of the flow path element 6. The illustrated embodiment shows the basic structural design of the flow path element 6 as a rectangular block and of the limiting element 7 as a cover element, with the adjustment units 2 and the drive units 3 of the individual valves being represented and arranged on the limiting element 7.

Figure 2:
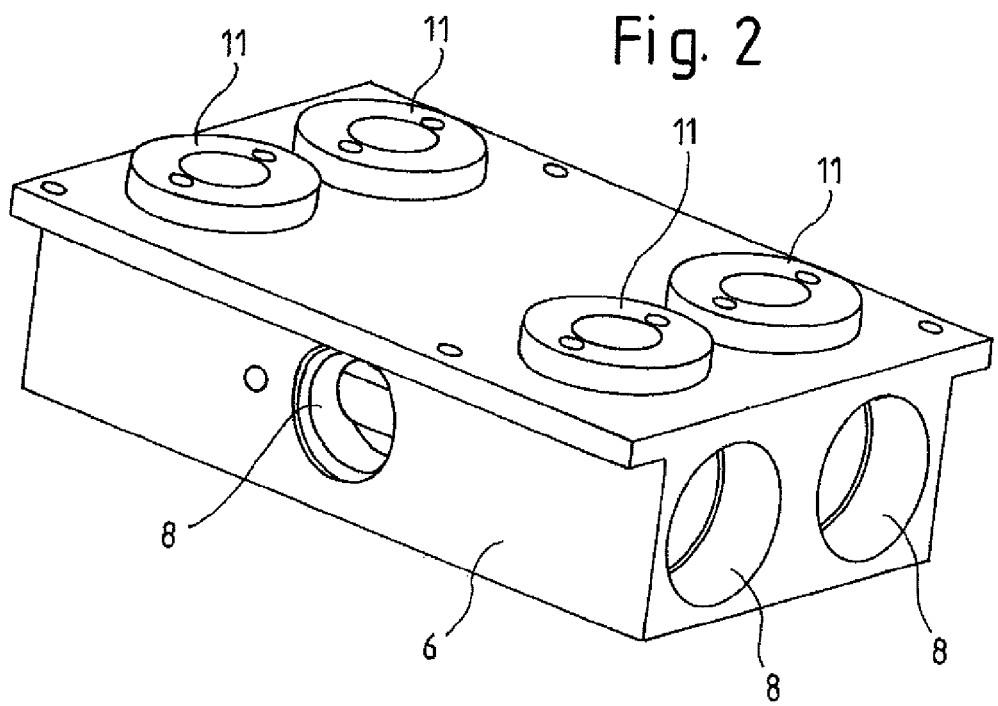
FIG. 2: a perspective representation of a flow path element as part of the valve block, FIG. 3 a sectional representation of a plan view of the flow path element along the flow paths

FIG. 2 shows a perspective view of the flow path element 6 as part of the valve block 4. The flow path element 6 comprises a plurality of flow paths 5 which emerge at the outer margins of the flow path element 6 as fluid connections 8. On the upper side of the flow path element 6, openings 11 for receiving and for securing the adjustment unit 2 and the drive unit 3 are provided. In the embodiment shown, the openings 11 are designed as bores, which extend up to the stepped bores of the flow paths 5 that lie below said openings 11.

Figure 3:
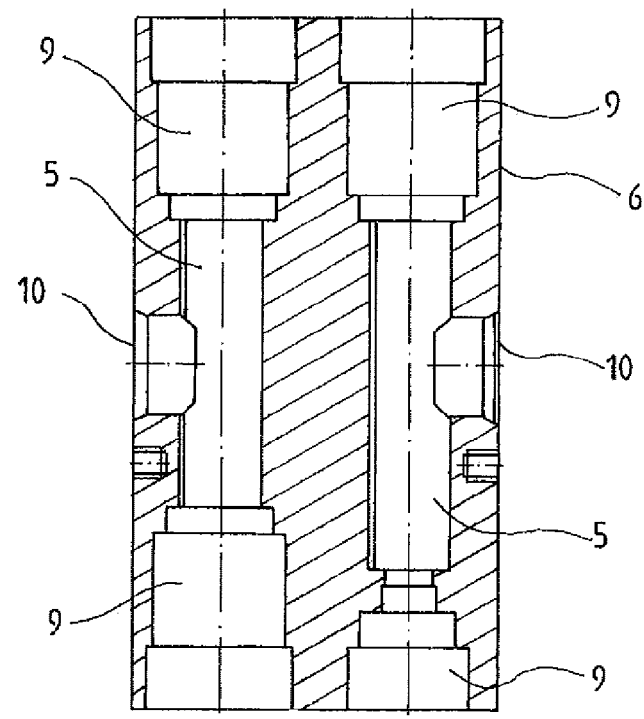

FIG. 3 shows a sectional representation of a plan view of the flow path element 6 along the flow paths 5. The flow paths 5 are designed as stepped bores 9, with two stepped bores 9 in each case being disposed opposite one another and extending up to the center of the flow path element 6, and with the diameter of the stepped bores 9 progressively decreasing. Refrigerant connections 10 are provided on the side, lying coplanar with the stepped bores 9 and therefore with the flow paths 5.

Figure 4:
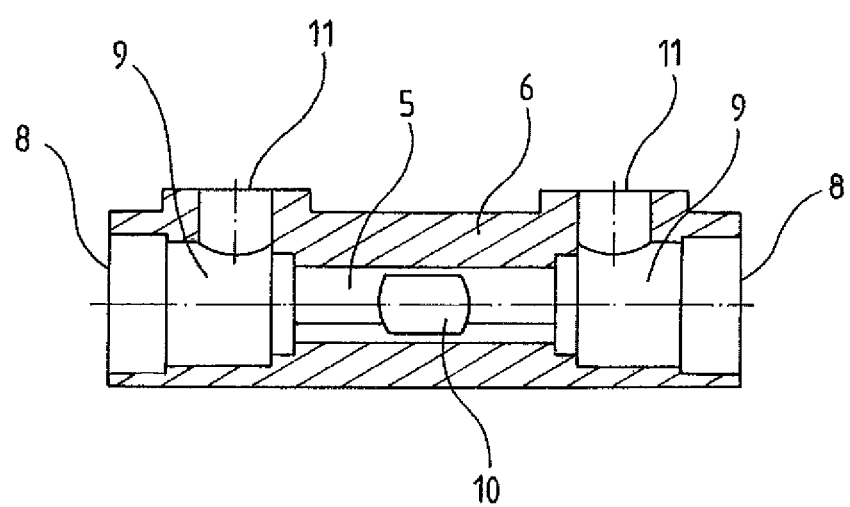
FIG. 4: a sectional representation of a side view of the flow path element along a flow path.

FIG. 4 shows a sectional representation from a side of the flow path element 6 along the flow path 5. In this diagram, the stepped bores 9 extend on opposite sides through the flow path element 6, and the openings 11 are introduced from the top as bores. The openings 11 serve to receive the adjustment units 2, which are not shown. Alternatively or in combination, these may also be implemented at the ends with the fluid connections 8.

This representation shows the refrigerant connection 10 at the center of the flow path 5 in the flow path element 6.

LIST OF REFERENCE SIGNS 1 valve block assembly
2 adjustment unit
3 drive unit
4 valve block
5 flow path
6 flow path element
7 limiting element
8 fluid connections
9 stepped bore
10 refrigerant connection
11 opening

The invention claimed is:

1. A valve block assembly comprising:
   a valve block including a flow path element and a limiting element disposed on the flow path element;
   a plurality of fluid connections formed in the flow path element;
   a plurality of refrigerant connections formed in the flow path element;
   a plurality of flow paths formed in the flow path element;
   a plurality of adjustment units disposed on the limiting element, wherein the limiting element is disposed between the plurality of adjustment units and the flow path element as a separate plate for sealing, wherein each of the plurality of adjustment units align with one of the plurality of flow paths, and wherein the plurality of adjustment units is disposed on opposing sides of the plurality refrigerant connections; and
   a plurality of drive units disposed on the limiting element and in kinematic communication with the plurality of adjustment units.

2. The valve block assembly of claim 1, wherein the flow path element is a plate.

3. The valve block assembly of claim 1, wherein the plurality of fluid connections is formed at opposing ends of the flow path element, each of the plurality of fluid connections continuous with one of the plurality of flow paths.

4. The valve block assembly of claim 1, wherein each of the plurality of adjustment units has an adjustment element providing kinematic communication between the plurality of adjustment units and the plurality of drive units, and wherein the limiting element has a plurality of feed-through openings formed therein, each of the plurality of feed-through openings receiving one of the adjustment elements of one of the plurality of adjustment units.

5. The valve block assembly of claim 1, wherein a seal is disposed intermediate the flow path element and the limiting element, and wherein the seal is one of an adhesive bond, a sealing strip, a metallic seal, and a soft surface seal.

6. The valve block assembly of claim 1, wherein the flow path element is a substantially rectangular block.

7. The valve block assembly of claim 1, wherein opposing ends of each of the plurality of flow paths are each configured as a stepped bore, wherein a diameter of the stepped bore of each of the plurality of flow paths decreases from a corresponding end of the opposing ends to a center of the plurality of flow paths.

8. The valve block assembly of claim 7, wherein a plurality of openings is formed in the flow path element, each of the plurality of openings is perpendicular to and extends into one of the stepped bores and receives one of the plurality of adjustment units.

9. The valve block assembly of claim 8, wherein the plurality of openings is covered by the limiting element.

10. The valve block assembly of claim 1, wherein each of the plurality of drive units is coupled to the limiting element.

11. The valve block assembly of claim 1, wherein each of the plurality of adjustment units is configured as a substantially spherical valve.

12. The valve block assembly of claim 1, wherein each of the plurality of drive units is in signal communication with a LIN bus controller.

* * * * *